(12) United States Patent
Klemm et al.

(10) Patent No.: US 11,856,141 B2
(45) Date of Patent: Dec. 26, 2023

(54) METHODS AND SYSTEMS OF PROVIDING RESPONSE BASED ON COMMUNICATION SESSION PARTICIPANT REQUEST URGENCY

(71) Applicant: Avaya Management L.P., Durham, NC (US)

(72) Inventors: Reinhard P. Klemm, West New York, NJ (US); George Erhart, Loveland, CO (US); Tamas Smahajcsik-Szabo, Budapest (HU); Oliver Huber, Mainz (DE); Wen-Hua Ju, Monmouth Junction, NJ (US); John Young, Buntingford (GB)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/543,146

(22) Filed: Dec. 6, 2021

(65) Prior Publication Data

US 2023/0179708 A1 Jun. 8, 2023

(51) Int. Cl.
*H04M 3/51* (2006.01)
*H04L 51/02* (2022.01)
*H04M 3/523* (2006.01)

(52) U.S. Cl.
CPC .......... *H04M 3/5166* (2013.01); *H04L 51/02* (2013.01); *H04M 3/5183* (2013.01)

(58) Field of Classification Search
CPC .... H04M 3/5166; H04M 3/5183; H04L 51/02
USPC ............ 379/266.07, 265.05, 265.11, 266.08, 379/266.01, 265.01
See application file for complete search history.

(56) References Cited

U.S. PATENT DOCUMENTS

| | | | |
|---|---|---|---|
| 8,515,049 B2 | 8/2013 | Chavez et al. | |
| 11,115,353 B1* | 9/2021 | Crowley | G06F 40/284 |
| 2003/0016812 A1* | 1/2003 | Rodenbusch | H04M 3/5158 379/266.05 |
| 2003/0198336 A1* | 10/2003 | Rodenbusch | H04M 3/5158 379/266.1 |
| 2004/0179676 A1* | 9/2004 | Okuda | H04M 1/585 379/406.01 |
| 2015/0063556 A1 | 3/2015 | Uba et al. | |
| 2021/0064827 A1* | 3/2021 | Galitsky | G06F 40/284 |

* cited by examiner

*Primary Examiner* — Thjuan K Addy
(74) *Attorney, Agent, or Firm* — Sheridan Ross P.C.

(57) ABSTRACT

Systems and methods include generating an urgency score associated with data associated with a communication session based on processing the data and using the urgency score to modify a behavior of a bot or a call center agent and optimize a contact center. Systems and methods include modifying behavior of a bot or an agent during the communication session in response to the data. Systems and methods include modifying dialog of a bot, or a script of an agent, and modifying a control flow for the communication session. Optimizing a contact center includes adjusting a workload of an agent associated with the communication session.

20 Claims, 5 Drawing Sheets

Agent Workflow Panel – Main Page

Calls Currently In Progress

| Other Party | Length | Current Status | Urgency Score |
|---|---|---|---|
| Caller A | 33 min | On Hold | 55 |
| Caller B | 18 min | On Hold | 43 |
| Caller N | 4 min | Speaking | 68 |

Week Summary

| Total Calls | Total Time | Average Urgency |
|---|---|---|
| 95 | 1,710 min | 44 |

Day Summary

| Total Calls | Total Time | Average Urgency |
|---|---|---|
| 15 | 270 min | 63 |

Call Panel – Call with Caller N

Script

Hello Caller N, I see you have a problem with your latest bill.

Could you please verify your address?

Recommendation

Ask if Caller N would agree to speak over the phone instead of using text.

Urgency Summary

Urgency: 68/100
Baseline: 20/100
Cause: Financial
Source: Based on Caller N's personal history

*Fig. 3A*

Center Workflow Management Panel

Calls Currently In Progress

| Local Party | Other Party | Length | Urgency Score |
|---|---|---|---|
| Agent Xx | Caller N | 4 min | 68 |
| Agent Yy | Caller E | 11 min | 27 |
| Agent Zz | Caller F | 27 min | 15 |

Week Summary

| Agent | Total Number of Calls | Total Length | Average Urgency |
|---|---|---|---|
| Agent Xx | 95 | 1,710 min | 44 |
| Agent Yy | 87 | 1,100 min | 37 |
| Agent Zz | 121 | 1,650 min | 28 |

Agent Statistics

Agent: Agent Xx

Calls Currently In Progress

| Other Party | Length | Current Status | Urgency Score |
|---|---|---|---|
| Caller A | 33 min | On Hold | 55 |
| Caller B | 18 min | On Hold | 43 |
| Caller N | 4 min | Speaking | 68 |

Week Summary

| Total Calls | Total Time | Average Urgency |
|---|---|---|
| 95 | 1,710 min | 44 |

Day Summary

| Total Calls | Total Time | Average Urgency |
|---|---|---|
| 15 | 270 min | 63 |

*Fig. 3B*

METHODS AND SYSTEMS OF PROVIDING RESPONSE BASED ON COMMUNICATION SESSION PARTICIPANT REQUEST URGENCY

FIELD OF THE INVENTION

The present disclosure relates generally to communication sessions and more particularly to providing a response based on urgency of a communication session participant request.

BACKGROUND OF THE INVENTION

Businesses conventionally use call center services to enable customers to call and speak with a representative for support. For example, tech companies use call centers to provide technical support and airline companies use call centers to provide customer support. As business is increasingly conducted at a distance, more and more customers use call centers to speak with representatives of businesses. As more and more customers use call centers, the customers increasingly outnumber representatives such as call center agents.

To better handle incoming calls, and to prevent callers from waiting on hold for large amounts of time, call centers are increasingly making use of automated response systems such as bots. Bots can be used to gather information from callers, such as user profile information and the reason why the caller is calling. Such information can be used to either totally handle the call—by providing the information which the caller seeks—or to direct the caller to the best agent capable of handling the call.

While bots and other forms of automated response systems provide a great benefit for the average caller, bots and other forms of automated response systems cannot conventionally adequately respond to urgent matters. For example, with conventional systems, when a caller has a critical issue which requires a prompt and serious response, the caller must speak with the same bots and other forms of automated response systems and wait with the same hold music as callers with less critical issues which do not require a prompt response.

As a result, time-critical issues are often not properly resolved and callers with urgent problems do not receive satisfaction. What is needed is a system capable of identifying and handling such callers.

BRIEF DESCRIPTION OF THE DRAWINGS

The exemplary embodiments of the present disclosure will be described in detail, with reference to the following figures, wherein:

FIGS. 3A and 3B are illustrations of user interfaces in accordance with the present disclosure.

Figure 1:
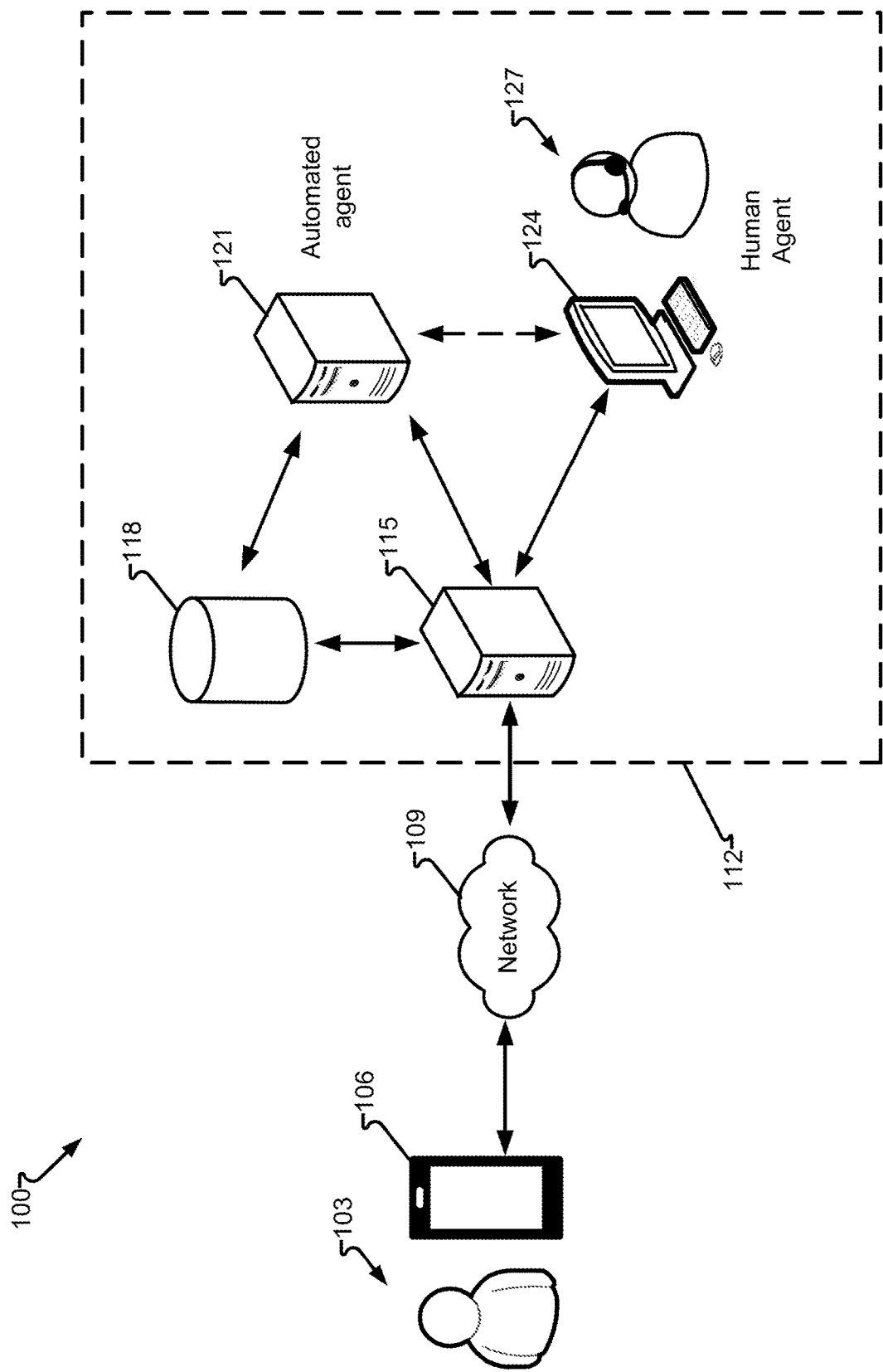
FIG. 1 illustrates an exemplary communications environment according to the present disclosure.

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

The invention will be described below in relation to a communications environment. Although well suited for use with circuit-switched or packet-switched networks, the invention is not limited to use with any particular type of communications system or configuration of system elements and those skilled in the art will recognize that the disclosed techniques may be used in any application in which it is desirable to provide responses to internet/intranet posts. For example, the systems and methods disclosed herein will also work well with SIP-based communications systems and endpoints. Moreover, various endpoints usable with the present invention can be any communications device such as a PC, telephone, speakerphone, cellular phone, SIP-enabled endpoint, softphone, PDA, conference system, video conference system, wired or wireless communication device, or in general any communications device that is capable of sending and/or receiving voice and/or data communications.

The exemplary systems and methods of this invention will also be described in relation to software, modules, and associated hardware and network(s). In order to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

A number of variations and modifications of the invention can be used. It would be possible to provide or claim for some features of the invention without providing or claiming others.

Some of the exemplary systems and methods of this invention have also been described in relation to a Customer Service 2.0/Web 2.0 environment which commonly associated with web applications that facilitate interactive information sharing, interoperability, user-centered design, and collaboration on the Internet. Examples of Web 2.0 include web-based communities, hosted services, web applications, social-networking sites, video-sharing sites, wikis, blogs, mashups, and folksonomies. A Web 2.0 site allows its users to interact with other users or to change website content, in contrast to non-interactive websites where users are limited to the passive viewing of information that is provided to them. However, to avoid unnecessarily obscuring the present invention, the description omits a number of known structures and devices common to this environment. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated, certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network, or a cable network.

As will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Referring now to FIG. 1, a block diagram of a communication system 100 is shown in accordance with at least some embodiments of the present disclosure. The communication system 100 of FIG. 1 may be a distributed system and, in some embodiments, comprises a communication network 109 connecting one or more communication devices 106 with a communication server 115. The network 109 may be, for example, a public switched telephone network (PSTN) or other type of telephony system. The communication server 115 may be a part of a local or distributed network 112 such as a network of a call center. The communication system 100 may include, but is not limited to, a first communication device 106a communication server 115, and a memory storage device 118. The communication server 115 may provide collaborative communication sessions, conference meetings, multi-party calls, SIP functionality, traditional telephone calls, and/or other audio/video communication services. In some embodiments, the communication server 115 may correspond to an SBC, or other communications controller, through which communications pass as part of a communication session established between two or more communication devices such as a communication device 106 operated by a user 103, a computer system 121 functioning as an automated agent, and a computer system 124 operated by a human agent 127. The communication device 106 may be, for example, a telephone such as a smartphone or other type of device capable of or configured to perform telephone calls via a telephony network such as PSTN.

Although the communication server 115 may control communication sessions between communication devices, it should be appreciated that the functionality of the communication server 115 as described herein may be provided by at least one of the computer systems 121, 124 in the network 112. Stated another way, the computer systems 121, 124 of the network 112 may comprise the various instructions, conditions, rules, and/or data described herein as being performed by the communication server 115. In this manner, the computer systems 121, 124 may communicate with one another across the network 112 as well as with external devices such as communication device 106 via a network 109 such as the PSTN without requiring inclusion of the communication server 115 to provide the conditional requirements and compliance assurances described herein.

It is an aspect of the present disclosure that the users 103, 127 may establish a communication session, such as a phone call. In particular, each of the users 103, 127 may use a respective communication device 106 or computer system 124 to initiate a call and dial out to another user 103, 127 across the network 109. Upon initiating the call, one or more devices (e.g., computer systems 121, 124, communication server 115, etc.) in the network 112 may perform call-related processes, such as call recording or other types of call monitoring processes. Although only two users 103, 127 and corresponding communication devices 106 and computer systems 124 are illustrated in FIG. 1, it should be appreciated that the communication system 100 may comprise any number of users and communication devices or computer systems capable of communicating via the PSTN or other type of telephony network.

In accordance with at least some embodiments of the present disclosure, the network 109 may comprise any type of known communication medium or collection of communication media and may use any type of protocols to transport messages between endpoints. The communication network 109 may include wired and/or wireless communication technologies. The Internet is an example of the communication network 109 that constitutes an Internet Protocol ("IP") network consisting of many computers, computing networks, and other communication devices located all over the world, which are connected through many telephone systems and other means. Other examples of the communication network 109 include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a VoIP network, a SIP network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

In some embodiments, at least one of the communication devices 106 or computer systems 124, 127 may correspond to a computing device, a personal communication device, a portable communication device, a laptop, a smartphone, a tablet, a personal computer, and/or any other communication device capable of running an operating system ("OS"), at least one voice application, communication instructions, and/or the like. The communication devices or computer systems may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication devices or computer systems may also have any of a variety of applications, including for example, voice applications, chat applications, calling applications, email applications, SIP applications, etc., and/or combinations thereof. Additionally or alternatively, the communication devices or computer systems, in some embodiments, may be any other electronic device, such as an Internet-enabled mobile telephone and/or a personal digital assistant, capable of communicating via the communication network 109.

In some embodiments, communications may be sent and/or received via a respective communication device or computer system as a telephone call, a packet or collection of packets (e.g., IP packets transmitted over an IP network), an email message, an instant message ("IM"), a short message service ("SMS") message, a multimedia messaging service ("MMS") message, a chat, and/or combinations thereof. In some embodiments, the communication devices and/or computer systems may communicate over an audio and/or a video channel over the communication network 109.

Figure 2:
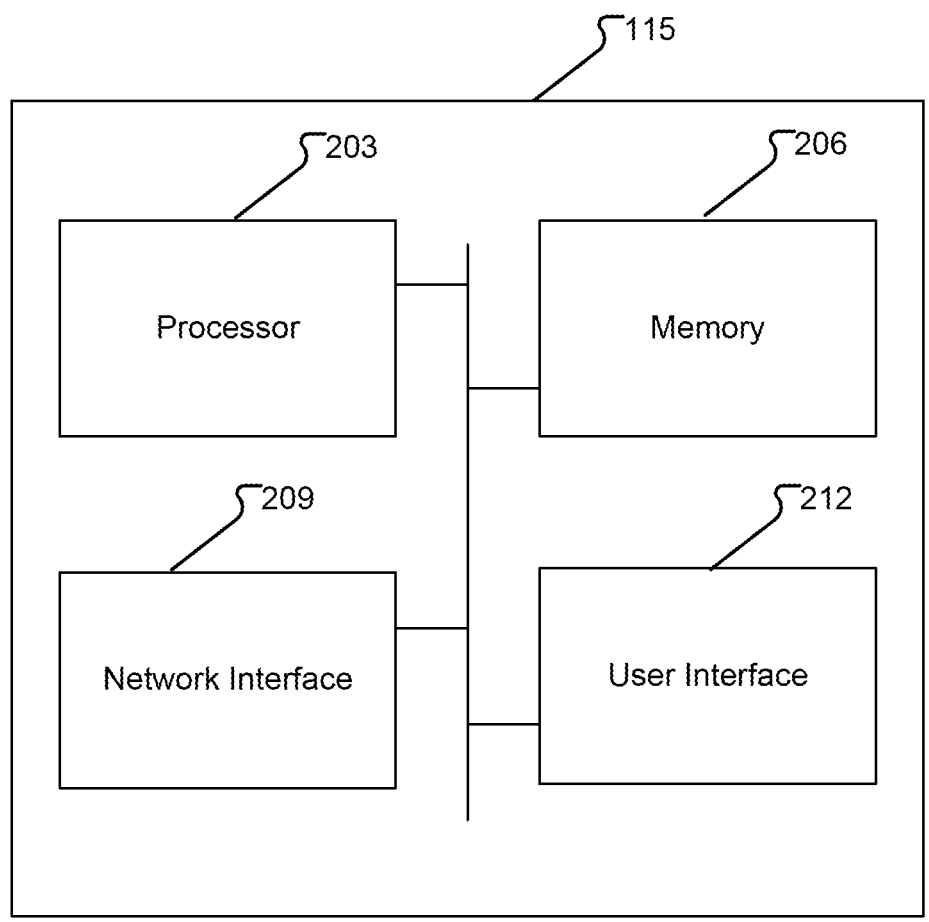
FIG. 2 illustrates an exemplary communications environment according to the present disclosure.

As illustrated in FIG. 2, the communication server 115 may include hardware and/or software resources that, among other things, provides the ability for controlling calls between users 103, 127 and/or automated agents executed by computer systems (e.g., via associated communication devices 106, computer systems 124, 127, etc.). Among other things, the communication server 115 may provide communication functionality that allows the communication devices and/or computer systems to hold party-to-party calls, multi-party calls, conference calls, and/or other collaborative communications over a same communication channel, in an established communication session. The communication server 115 may include a network interface 209, a processor 203, a user interface 212, and a memory 206. The memory 206 may comprise communication instructions, and/or the like.

The network interface 209 may provide the communication server 115 with the ability to send and receive communication packets or the like over the communication network 109 and/or the network 112. The network interface 209 may be provided as a network interface card ("NIC"), a network port, a modem, drivers for the same, and the like. Communications between the components of the communication server 115 and other devices connected to the communication network 109 or part of the network 112 may flow through the network interface of the communication server 115. In some embodiments, examples of a suitable network interface 209 include, without limitation, an antenna, a driver circuit, an Ethernet port, a modulator/demodulator, an NIC, an RJ-11 port, an RJ-45 port, an RS-232 port, a USB port, etc. The network interface 209 may include one or multiple different network interfaces depending upon whether the communication server 115 is connecting to a single communication network or multiple different types of communication networks. For instance, the communication server 115 may be provided with both a wired network interface and a wireless network interface without departing from the scope of the present disclosure. In some embodiments, the network interface 209 may include different communications ports that interconnect with various input/output lines.

In some embodiments, the processor 203 of the communication server 115 may correspond to one or more computer processing devices. For example, the processor 203 may be provided as silicon, an Application-Specific Integrated Circuit ("ASIC"), as a Field Programmable Gate Array ("FPGA"), any other type of Integrated Circuit ("IC") chip, a collection of IC chips, and/or the like. In some embodiments, the processor 203 may be provided as a Central Processing Unit ("CPU"), a microprocessor, or a plurality of microprocessors that are configured to execute the instructions sets stored in memory. Upon executing the instruction sets stored in memory 206, the processor 203 enables various communications, compliance (e.g., authentication, checking, verification, and/or authorization, etc.), and/or interaction functions of the communication server 115, and may provide an ability to establish and maintain communication sessions between communication devices (e.g., communication device 106) and/or computer systems 121, 124 over the communication network 109 when specific predefined conditions are met.

The memory 206, or storage memory, may correspond to any type of non-transitory computer-readable medium. In some embodiments, the memory 206 may comprise volatile or non-volatile memory and a controller for the same. Non-limiting examples of the storage memory 206 that may be utilized in the communication server 115 may include Random Access Memory ("RAM"), Read Only Memory ("ROM"), buffer memory, flash memory, solid-state memory, or variants thereof. Any of these memory types may be considered non-transitory computer memory devices even though the data stored thereby can be changed one or more times. The memory 206 may be used to store information about communications, identifications, conditional requirements, times, authentication, authorization, compliance, history, and/or the like. In some embodiments, the memory 206 may be configured to store rules and/or the instruction sets depicted in addition to temporarily storing data for the processor 203 to execute various types of routines or functions. Although not depicted, the memory 206 may include instructions that enable the processor 203 to store data into a memory storage device 118 and retrieve information from the memory storage device 118. In some embodiments, the memory storage device 118 or the data stored therein may be stored internal to the communication server 115 (e.g., within the memory 203 of the communication server 115 rather than in a separate database) or in a separate server.

The communication instructions, when executed by the processor 203, may provide the ability for at least one of the communication devices (e.g., communication device 106) associated with a user (e.g., user 103) to establish one or more communication sessions that enable calls, messaging, holding, or conducting communications, and/or otherwise sending and receiving messages via the communication session. The communication instructions may use existing private branch exchange ("PBX") equipment, services, and/or infrastructure. The communication server 115 and the processor 203 executing the communication instructions may enable call routing, call authorization, and call termination. Examples of other functions performed via the communication instructions, when executed by the processor 203, include, but are in no way limited to, normalizing disparate networks, providing centralized routing of calls and management of user profiles, supporting converged voice and video bandwidth management, providing application sequencing capabilities, etc., and/or combinations thereof.

In some embodiments, the communication instructions may define rules and instructions for interactions between the communication server 115 and at least one of the communication devices (e.g., communication device 106) and computer systems (e.g., computer system 121, 124) in the communication system 100. The communication instructions may cause applications, web pages, pop-ups, and/or other digital interactions to be presented by the display of a computer system 121, 124. The communication instructions, when executed by the processor 203, may determine to present a user with one or more voice application pages, call options, request input, and/or provide other forms of output. These interactions may be provided by sending a message to a computer system 121, 124 over the network 112 in the communication system 100 causing a display device of the computer system 121, 124 to render information and user-selectable options. The communication instructions may be configured to perform at least some steps of the methods described in conjunction with FIGS. 3B and 3C and as otherwise described herein.

The user interface 212 may correspond to any type of input and/or output device, or combination thereof, that enables a user to interact with the communication server 115. As can be appreciated, the nature of the user interface 212 may depend upon the nature of the communication server 115. Examples of the user interface 212 may include, but are in no way limited to, user interface hardware and devices such as at least one touch-sensitive display elements, buttons, switches, keyboards, peripheral interface devices (e.g., mice, controller, joysticks, etc.) as described herein. It is an aspect of the present disclosure that one or more devices in the user interface 212 may provide an input that is interpreted by the processor 203 in controlling one or more components of the communication server 115.

The processor 203 may correspond to one or many computer processing devices. Non-limiting examples of a processor include a microprocessor, an IC chip, a General Processing Unit ("GPU"), a CPU, or the like. Examples of the processor 203 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture. The processor 203 may be a multipurpose, programmable device that accepts digital data as input, processes the digital data according to instructions stored in its internal memory, and provides results as output. The processor 203 may implement sequential digital logic as it has internal memory.

The network interface 209 may comprise hardware that facilitates communications with other devices (e.g., communication devices, computer systems, and/or servers, etc.) over the communication network 109 or the network 112. In some embodiments, the network interface 209 may include an Ethernet port, a Wireless Fidelity ("Wi-Fi") card, an NIC, a cellular interface (e.g., antenna, filters, and associated circuitry), or the like. The network interface 209 may be configured to facilitate a connection between the communication device 106 and the communication server 115, and/or computer systems 121, 124, via the communication network 104 and/or network 112.

The memory 206 may correspond to any type of non-transitory computer-readable medium. In some embodiments, the memory 206 may comprise volatile or non-volatile memory and a controller for the same. Non-limiting examples of memory 206 that may be utilized in the communication server 115 may include RAM, ROM, buffer memory, flash memory, solid-state memory, and/or variants thereof. Any of these memory types may be considered non-transitory computer memory devices even though the data stored thereby can be changed one or more times. In some embodiments, the memory 206 may be configured to store rules and/or the instruction sets depicted in addition to temporarily storing data for the processor 203 to execute various types of routines or functions.

In some embodiments, the communication server 115 may comprise at least one display device that renders information, applications, windows, interactive elements, and/or other visual output via a user interface 212. The communication server 115 may further include at least one display controller that controls an operation of the display device. This operation may include the control of input (e.g., input provided by a user via the user interface 212, command input via the instruction sets in memory 206, and/or combinations thereof, etc.), output (e.g., display, rendered images, window behavior, etc.) and/or other functions of the display controller and display device.

As described above, the display device may comprise at least one display screen that selectively activates pixels and/or display elements to render one or more applications, windows, controls, interactive elements, icons, characters, images, etc. Examples of the display screen may include, but are in no way limited to, a Liquid Crystal Display ("LCD"), a Light Emitting Diode ("LED") display, an Electroluminescent Display ("ELD"), an Organic LED ("OLED") display, and/or some other type of display. In some embodiments, the display device may be configured to render information in one or more discrete areas (e.g., backgrounds, portions, windows, zones, etc.) of the display screen or superimposed in an area of the display screen.

For example, as illustrated in FIGS. 3A and 3B, display devices 300, 350 may be configured to display a variety of user interfaces 303, 353. Such user interfaces 303, 353 may be displayed in conjunction with one or more of the systems and methods described herein. User interfaces may be used to display data associated with applications. For example, and as described in greater detail below, user interfaces may be displayed on terminals used by call center agents. Such user interfaces may be used to display information relating to ongoing calls. As described in greater detail below, call center agents may be responsible for a plurality of calls simultaneously. A user interface may be used to display information relating to one or more calls. A user interface displayed on call center terminals used by call center agents may display user customizable information relating to one or more calls.

As illustrated in FIG. 3A, a display device 300 may display a user interface 303 which may display information relating to a call center agent associated with the display device 300. Such information may include but should not be considered as being limited to an identity of the call center agent, a list of current ongoing communication sessions, a weekly total number of communication sessions associated with the call center agent, an overview of the total weekly number of sessions associated with the call center agent, etc. The overview of the total weekly number of sessions associated with the call center agent may include data such as a relative urgency score as discussed in greater detail below. Using such an overview, the call center agent may be enabled to have a quick view of his or her total workload for the week. It should be appreciated the discussion of a week is for example purposes only and should not be considered as being limited to a week. For example, the time period may be a day, month, year, etc. The user interface 303 may also display information relating to a single call associated with a call center agent. For example, the user interface 303 may display information such as an identity of a customer or other person associated with the call, a current runtime for the call, an urgency score associated with the call as discussed in greater detail below, a script for the agent to follow, suggestions for a change in call type as discussed in greater detail below, etc.

In some embodiments, the user interface 303 may display one or more of an absolute urgency score and a relative urgency score. An absolute urgency score may be a raw urgency score of a communication session without considering any past communication sessions or other calls. A relative urgency score may on the other hand be an indication of the relative urgency of the communication session with respect to past communication sessions and/or other calls. In some embodiments, the relative urgency score may be calculated as a difference between the average urgency score and the raw urgency score of the current conversation. The absolute and relative urgency scores may be presented as a number on a scale, such as from one to ten, or as a percentage. In this way, an agent may be enabled to see that the conversation he or she is about to enter is either less urgent, more urgent, or at an average urgency relative to past conversations. Such an indication may be visually represented with color or an icon. For example, when a caller with a relatively high level of urgency is routed to a call agent, a terminal used by the call agent may display a visual indication that the caller has a relatively high level of urgency. The call agent may be enabled to see such an indication prior to the call agent accepting the call from the caller.

As illustrated in FIG. 3B, a display device 350 such as one operated by a manager of a call center may display a user interface 353. Such a user interface 353 may display information relating to calls currently in progress by one or more agents of the call center such as an identity of the agent, an identity of the other party to the call, a length of the call, and an urgency score as described in greater detail below. The user interface 353 may also display information relating to a weekly summary of calls made by the call center. For example, the user interface 353 may display a table comprising a list of agents, total number of calls made by each agent, a total length of time each agent has spoken on the phone, and an average urgency score for calls fielded by each agent.

The user interface 353 may also enable a user such as a manager of a call center to monitor statistics for one or more users such as call center agents. For example, statistics may include an indication of a name of a user being summarized in the statistics, a table describing calls currently in-progress, a summary of the user's weekly workload, and a summary of the user's daily work. As described below, the user interfaces 303, 353 may be used in conjunction with one or more systems and methods in accordance with embodiments described below.

Figure 4:
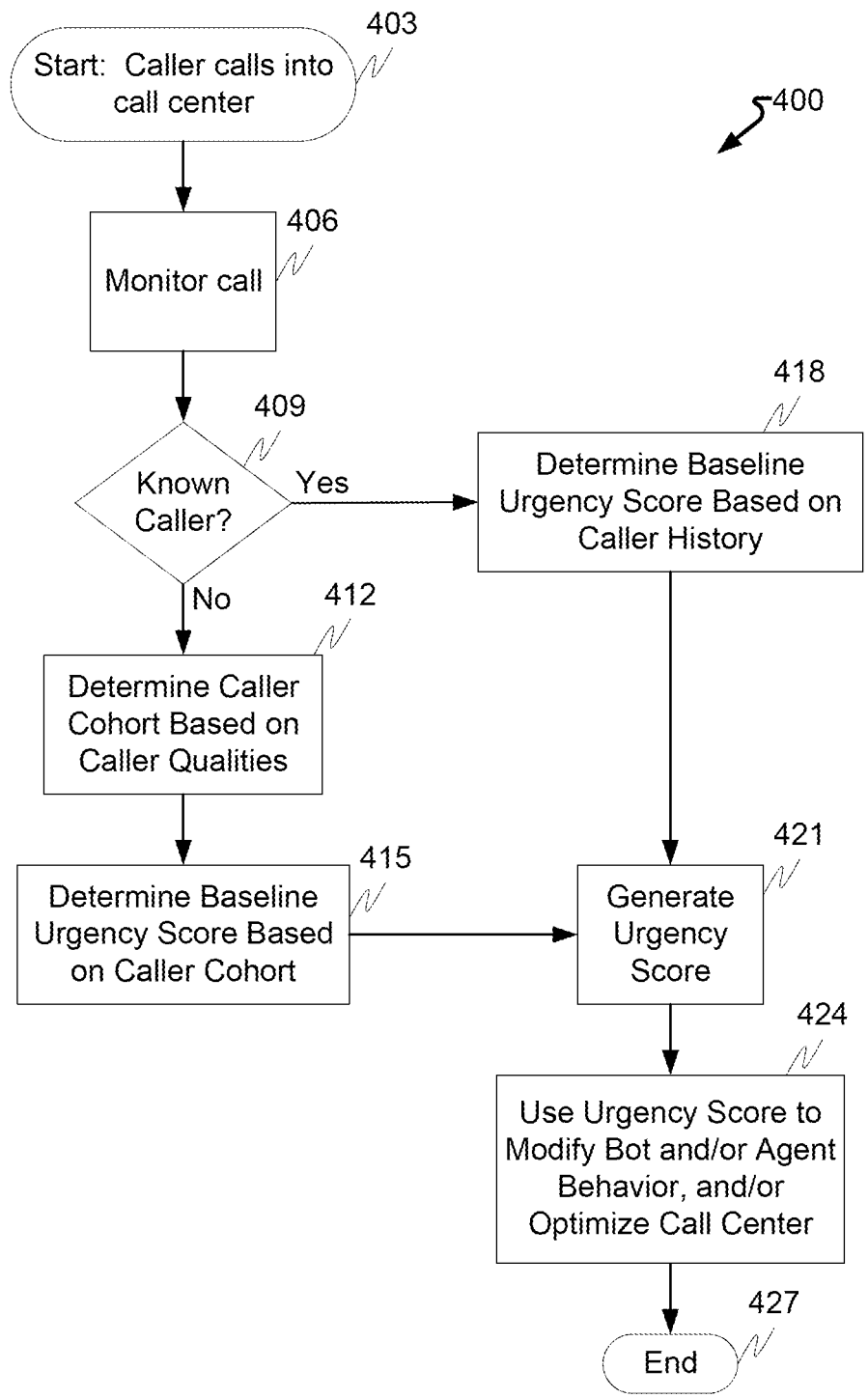
FIG. 4 is a flowchart outlining an exemplary method in accordance with the present disclosure.

As illustrated in FIG. 4, a method 400 may be implemented using one or more computer systems. For example, a computer system such as a communication server 115 as illustrated in FIG. 1 may be used to perform one or more steps of the method 400 such as generating an urgency score and modifying bot behavior as discussed below.

At 403, a communication session may begin. A communication session as described herein may be a phone call, a voice chat using a web application, a text messaging conversation over SMS or the web, a video call, etc. The communication session may begin with a caller calling into, for example, a call center or contact center.

When a call is received by the computer system, such as the communication server 115, the call may begin with the caller speaking with an automated voice response system such as a bot. During the communication session, text, audio, and/or video sent from the caller may be monitored and processed by the computer system at 406.

Monitoring the communication session may comprise in some embodiments recording audio created by the caller during the communication session. In some embodiments, recorded and/or live audio may be transcribed.

Transcribed audio and/or text sent from the caller, such as during a text communication, may be processed using an artificial intelligence (AI) engine. As discussed below, by processing audio and/or text from the communication session, the computer system may be enabled to determine types of words used by the caller, types of problems described by the caller, etc. which may be useful in computing an urgency score as discussed below.

In some embodiments, audio from the caller may also or alternatively be processed using an AI engine. Processing audio from the caller may enable the computer system to determine a tone of voice of the caller as described below which may be useful in computing an urgency score as discussed below.

In some embodiments, an AI engine may be used to process video data from the communication session. Processing video data from the communication session may enable the computing system to determine facial expressions, hand gestures, etc., which may be useful in computing an urgency score as discussed below.

An AI engine as described herein may be trained using training data which may be stored in a storage system 118 in communication with the computer system. The AI engine in some embodiments may be a process executed by another computer system external to the computer system.

At 409, the computer system may determine whether the caller can be identified. For example, the computer system may determine the caller is associated with a user profile. Identifying the caller may comprise requesting and/or receiving data from the caller. For example, the caller may be asked name, date of birth, address, etc., or may share such information without requiring a request.

Identifying the caller may also comprise categorizing the caller into a type of user. For example, the computer system may determine whether the caller is an existing customer or a new customer, an age group of the caller, a type of problem or issue experienced by the caller, the reason why the caller is calling, etc.

At 412, if the caller cannot be identified, the computer system may determine one or more characteristics or qualities about the caller to determine whether the caller belongs or can be associated with one or more cohorts.

A cohort may be a group of previous callers having one or more characteristics in common. Such characteristics may comprise, for example, age, sex, an issue giving rise to the call, a social media presence, a customer type, e.g., existing customer or new customer, size of portfolio, etc., or any other identifiable characteristic.

A caller may be associated with multiple cohorts, for example, a cohort based on an age group and a cohort based on callers with similar problems. A cohort may be a narrowly defined group, such as callers with similar ages, same gender, and same issue giving rise to the call, or may be a more widely defined group, such as merely a similar age.

After determining the caller belongs to one or more cohorts, the computer system may next determine a baseline urgency score based on the cohorts at 415. The baseline urgency score may be generated based in part on one or more prior communication sessions associated with other callers.

For example, urgency scores may be generated for past callers in a similar way as described herein. Such urgency scores may be stored in a database along with user information for each past caller. Using the database, the computer system may be enabled to identify a number of past callers within the same cohort or cohorts. The urgency scores for each past caller within the same cohort or cohorts may be used to generate a baseline score. Generating the baseline score may comprise determining an average urgency score for all past callers in the same cohort or cohorts.

The baseline urgency score can be used, as described below, to generate an urgency score for the caller him or herself. In this way, the urgency score can be generated based in part on a baseline urgency score associated with the other callers.

If the caller can be identified, the computer system may be enabled to determine a baseline urgency score based on a call history associated with the caller at 418. It should be appreciated that caller cohort information may also be used in the event the caller is known, for example in addition to or instead of using caller history.

Determining a baseline urgency score for the caller may comprise determining an urgency score for one or more past calls or communication sessions associated with the caller. Determining urgency scores for past calls may comprise performing a data lookup in a database. For example, after each communication session, user information and urgency levels or scores, as described below, may be stored in a database such as a table.

Determining the baseline urgency score for the caller based on past calls or communication sessions associated with the caller may comprise computing an average urgency score for all past calls or communication sessions associated with the caller. For example, consider a digital user who previously expressed a very high level of urgency when trying to determine the nearest business office to his/her home. An indication of the high level of urgency may be stored in a database associated the user. When the digital user calls again at a later time, the high level of urgency may be used as a baseline urgency score for the digital user.

It should be appreciated that even if the caller is known, the same cohort information discussed above can be applied to known callers such that a baseline urgency may be determined based on cohort information in addition to previously known user information.

In some embodiments, in the event that a caller is unknown, i.e., that the caller cannot be associated with any conversation history or is associated with a limited history, a baseline urgency or bias may be computed based on one or more attributes of the caller and/or the entity which the caller is calling. In some embodiments, an average bias or urgency score across all past calls may be computed. For example, an average urgency score for all calls for a particular company or a particular industry may be calculated and used as a baseline urgency.

In some embodiments, demographics of the caller, e.g., location, age, gender, etc., may be used to associate the caller with one or more cohorts. Location of the caller may be used to associate the caller with a cohort of other callers calling from the same or similar locations. For example, an average urgency score for callers calling from an airport may be relatively higher than an overall average urgency score for all callers. A caller determined to be calling from an airport may be associated with such a cohort and this have a relatively higher baseline urgency.

In some embodiments, particular situations may warrant separate bias or baseline urgency calculations due to one or more historic conversational biases which may be affected by one or more factors. The time of day, week, month, year, etc., during which the caller calls may be used to associate the caller with a cohort of callers calling at a same or similar time. For example, if a contact center is closed on weekends, then callers calling on Monday within the first thirty minutes of the call center opening may have a higher-than-average urgency. Each caller calling during such a time may be associated with a relatively higher level of urgency.

In some embodiments, business intent of a caller may be used to associate the caller with a cohort. Calls calling into a call center may seek to speak with a particular department such as sales or service. It may be determined that callers calling to speak with a particular department may have a relatively higher level of urgency as compared to callers calling to speak with a different department. For example, it may be determined that callers calling to speak with a service department have a relatively higher level of urgency than callers calling to speak with a sales department. When a caller is calling to speak with the sales department, the caller may be associated with a cohort of callers who also sought to speak with the sales department and may be given a relatively lower baseline urgency. Using such a system, a more accurate baseline urgency may be given to callers based on particular business intents.

At 421, an urgency score may be calculated by the computer system. As described herein, an urgency score may be computed for a single conversation during a communication session between a single caller, such as a customer, and an enterprise.

Calculating an urgency score as described herein may comprise a process of receiving data from a caller during a communication session and processing the received data during the communication session to determine factors relating to tone of voice, types of issue being described, whether the caller is using urgent words, etc. as described herein. In some embodiments, an urgency score may be calculated in part based on a frequency of a request made by a caller. For example, a relative urgency score assigned to a request from a caller who contacts a business frequently may be lowered simply based on contact frequency. Similarly, a caller who rarely contacts the business may be assigned a higher relative urgency score based on his or her call frequency.

Calculating an urgency score as described herein may comprise receiving audio, video, text, other information sent from the caller during the communication session. For example, while the caller is on the phone during the communication session, the caller's voice, text input by the caller, video of the caller, and any other information sent from the caller during the communication session may be received by the computer system and used to create the urgency score.

Calculating an urgency score as described herein may comprise processing the audio, video, text, and/or any other information received from the caller during the communication session. Processing the audio, video, text, and other information sent from the caller during the communication session may comprise putting the audio, video, text, and other information sent from the caller during the communication session into an artificial intelligence engine.

In some embodiments, the method may comprise converting audio into text. For example, prior to processing audio received during the communication session, the computer system may use a speech to text process to convert the audio to text which may be fed into the artificial intelligence engine for processing.

Audio during the communication session may be used to determine tone of voice of the caller. For example, processing audio received from a caller may enable the computer system to determine a pitch, timbre, or other vocal qualities associated with the caller. In some embodiments, processing audio may comprise comparing a caller's voice with one or more voice prints stored in memory. Comparing a caller's voice with voice prints may enable the communication session to identify the caller and/or associate the caller with a known user profile. Processing audio from a call may also enable the computer system to detect vocal events such as crying, screaming, shouting, or whether it the user is speaking with a soft and/or calm voice. The overall volume level may be used by the computer system to estimate an urgency of the caller.

Text received from the caller during the communication session as well as audio received during the communication session, whether converted to text or not, may be used to detect the use of urgent words such as "help," "this is important," etc., as well as detect the problem or issue being described by the caller.

In some embodiments, certain problems or issues may be associated with certain levels of urgency. For example, depending on the application different problems may be associated with different levels of urgency. In some embodiments, analyzing text and/or audio shared by a caller during a communication session may enable the computer system to analyze word choice of the caller.

For example, the computer system may be enabled to determine whether or not the content shared by the caller during the communication session, whether audio or text, includes threats, either implicit or explicit. The computer system may be enabled to determine whether the content during the communication session includes threatening language or other forms of language which may indicate a heightened level of urgency.

The computer system may be enabled to determine whether the content during the communication session, is particularly negative or particularly positive. The computer system may be enabled to determine whether there is specific time and/or place mentioned during the communication session. The computer system may be enabled to determine whether the content during the communication session contains specific key words.

The computer system may also be enabled to determine a type of issue based on and/or text shared by a caller during a communication session. For example, the computer system may be enabled to determine whether the content during the communication session includes a request for assistance, the degree of specificity regarding the nature of a problem, whether the content during the communication session includes specific information such as names, phone numbers, part numbers, model numbers, a quotation from, for example, a repair person, customer service agent, and the like, whether a number of other calls have been received regarding the same matter, etc. For example, a request to find the maximum carryon baggage size is probably never going to be urgent, even if the user speaks with urgent language or tone of voice.

Video received from the caller during the communication session may be used by the computer system to detect facial feature to determine a level of urgency. For example, the AI engine may be comprised of a convolutional neural network configured to accept input images such as stills from a video or moving images and configured to output, based on the input, an indication as to the urgency based on detected facial features.

Determining a type of caller may comprise determining the caller is a known customer, whether the caller has a customer history, whether the caller is a new customer, e.g., opened an account within past week, whether the caller is an unknown customer, whether the caller is a customer who often calls customer support, etc.

By analyzing the data received from the caller during the communication session, the computer system may be enabled to compute an urgency score based both on the content of the communication session, i.e., the actual issue being described by the caller, as well as the behavior of the caller, e.g., the caller's tone of voice, word choice, status as a customer, etc.

In some embodiments, computing the urgency score may comprise generating a number representing a relative urgency of the caller during the communication session as compared to other callers in other communication sessions. An urgency score can be a real number in an interval such as [0, 1], a discrete value in a set of N possible values, a percentage, or in another format. For example, computing an urgency score may comprise determining a relative urgency based on an overall maximum urgency.

The information received from the caller may be considered in addition to any baseline urgency score information which may be computed based on the caller's identity or the cohorts with whom the caller may be associated. For example, a scoring system may be used in which the baseline provides a minimum urgency score and any information received during the communication session, such as information obtained based on processing the caller's tone of voice or word choice, may be added to the baseline score to obtain a total urgency score.

In some embodiments, an urgency score for a caller may be based in part on an assessment made by a human such as a call center agent. For example, when a call center agent is on a call with a caller, the call center agent may be presented with a user interface enabling the call center agent to input an urgency score, such as a number on a scale such as from one to ten. The urgency score provided by the call center agent while on the call with the caller may be used by the computer system to calculate the overall urgency score. In some embodiments, urgency scores provided by call center agents, or other users, may be used as part of a machine learning algorithm to provide feedback and train a neural network to generate the urgency scores automatically.

Generating an urgency score for a caller may in some embodiments comprise generating the urgency score based at least in part on a baseline urgency score based on the caller's history, such as described above in relation to step 418 in the case of the caller being a known caller, or on historical data relating to one or more cohorts associated with the caller such as described above in relation to step 415 in the case of the caller being an unknown caller. In some embodiments, an urgency score for a known caller may be generated based at least in part on both the specific caller's history as well as cohort data, for example the urgency score may be generated based on a baseline urgency score calculated using elements of both steps 415 and 418 as described above. Such a baseline urgency score calculation may be described as a hybrid approach.

A baseline urgency score may be used to generate an urgency score for a caller in any number of ways. For example, in some embodiments an initial urgency score may be generated based on data collected about the caller during the call and the initial urgency score may be modified based on the baseline urgency score.

Modifying the initial urgency score with the baseline urgency score may comprise derating the initial urgency score by subtracting a bias or the baseline urgency score.

The bias may be, for example, a moving average urgency score for the caller based on a particular number of preceding calls for the caller or for one or more cohorts associated with the caller.

Essentially, the goal for the baseline urgency score for a caller may be to determine or estimate the inherent urgency that the caller may express as part of his or her normal way of communicating, and to remove that inherent urgency from the calculation of the urgency score. In this way, a caller who seems to always be expressing urgent matters, no matter how urgent the matter actually is, will not have an unnecessarily high urgency score. On the other hand, a caller who speaks calmly and respectfully despite having a highly urgent issue will not have an unreasonably low urgency score. For example, consider a caller using a text based communication system to describe a relatively non-urgent issue, such as a billing question, to a call center agent. The caller may use all caps and exclamation points to describe the question but may not actually be intending to express any urgency. A computer system may be enabled to recognize the caller, based on prior conversations, tends to type with all caps and/or exclamation points when communicating and to, based on this recognition, generate an urgency score which does not take into account this feature of the caller when generating the urgency score for the call.

The urgency score as described herein may be generated taking into account any bias or baseline scores for a user or caller based on the user or caller's personal history and/or cohort data.

Once an urgency score is generated, the urgency score may be used by the computer system at 424. Using the urgency score may comprise performing actions or generating instructions configured to enable other computer systems to perform actions during or following the communication session. For example, during the communication session actions such as modifying behavior of a bot or instructions for a human to follow, such as a call center agent, may be performed in response to changes in the urgency score.

Over the course of the communication session, the urgency score may continuously change. As the urgency score changes and reaches different levels, each level may be associated with a different response. For example, different threshold levels of urgency may invoke different responses as discussed below.

An urgency score, computed for a customer request at the beginning of a conversation with a business, can be used to modify the dialog and control flow of the bot. Modifying bot behavior may comprise altering a flowchart or a tree of commands which the bot is instructed to follow. In some embodiments, a heightened urgency score may cause a bot to be instructed to follow a different set of instructions.

Modifying human behavior may comprise altering a script or one or more recommendations for a human, such as a call center agent, to follow when speaking with the caller during the communication session.

Modifying behavior of the bot may in some embodiments comprise generating or selecting a script or a response for the bot to output in response to the customer so as to reflect urgency. Modification of dialog: responses to the customer can be adjusted to reflect urgency.

Modifying behavior of a bot in response to a change in urgency score may enable a bot to appear to verbally recognize perceived urgency. For example, in response to a high level of urgency a bot may be instructed to state, "okay, I understand that your request is urgent, so let me help you" to calm the caller.

Modifying behavior of a bot in response to a change in urgency score may enable a bot to change its modality to facilitate customer input in the communication session. For example, instead of instructing a bot to request freeform textual input, which may be challenging to a customer at a high level of urgency, the bot may be instructed to provide options to a caller to input data through the use of graphical user interface buttons, menus, sliders, or other interactive widgets which may be easier for a customer at a high level of urgency to provide input. Such input options may be vitally important to a caller if his or her urgency stems from a state of distress.

Similarly, modifying behavior of a bot in response to a change in urgency score may enable a bot to simplify its wording or otherwise adapt to customer vernacular to facilitate customer input during the communication session.

In some embodiments, in response to a change in urgency score a control flow of a bot or a human such as a call center agent may be modified. Based on a perceived urgency score, a bot may take different types of actions and execute different sections of an overall workflow.

Modifying control flow of a bot in response to a high level of urgency may comprise ending the bot's dialogue and escalating the communication session to a live human agent. Modifying control flow of a bot in response to a high level of urgency may comprise, for example, skipping nonessential prompts for the caller or skipping banter and changing the tone of the bot's prompts and messages from exuberant or chipper to serious. Modifying control flow of the bot in response to a high level of urgency may comprise switching to a different sub-workflow that handles urgent cases. It should be appreciated that urgency may be orthogonal to traditional chatbot concepts such as intent recognition. A bot may be enabled to execute different types of sub workflows for a same recognized intent based on different urgency scores. It should be appreciated such changes are listed for example purposes only and any other changes may be implemented by a bot in response to a caller with a relatively high or low urgency score.

In some embodiments, modifying control flow of a bot in response to a high level of urgency may comprise reaching out to one or more external platforms (e.g., backend systems) based on urgency scores.

In some embodiments, the computer system may be configured to suggest or offer to change a customer interaction channel based on urgency. For example, a caller conducting the communication session via text for example in a browser window in response to a high urgency score may be presented with an offer or suggestion to switch from text to voice in response to the higher urgency score.

In some embodiments, in response to a change in urgency score a bot may be instructed to escalate the communication session. When a bot escalates an automated conversation of a communication session human agent, the process of transferring the communication session may be adjusted based on the calculated urgency score.

More urgent customer requests may be prioritized over less urgent customer requests if the number of live agents available at the time of escalation is lower than the number of escalating communication sessions. For example, if a highly urgent communication session is being transferred to a human agent and other communication sessions are on hold waiting to speak to the human agent the highly urgent communication session may be placed on a higher spot on the hold list based on its urgency score while communication sessions with lower urgency scores may be moved down on the hold list so that the more urgent communication session may be brought to the human agent sooner.

In some embodiments a user interface associated with a human agent of a call center may be modified based on urgency scores of incoming communication sessions. For example, live agents may see a visualization of the urgency score when they accept an inbound communication session. Human agents may be presented with a list of communication sessions which are currently on hold and waiting for the human agent. The list of communication sessions may comprise information such as current wait time as well as urgency score. Such a list of communication sessions may enable the human agent to select which call he or she should accept next. In some embodiments, agent-assist technologies such as scripts for human agents may be modified based on the incoming urgency score.

Modifications to human and/or bot behavior may be made during or after the communication session. For example, the above discussed modifications may be performed during the communication session to better enable the bot and/or humans speaking to the caller to handle the communication session. Other modifications may be performed after the communication session.

In some embodiments and urgency score associated with the communication session may affect future behavior of bots and/or instructions for human users. For example, after a communication session, information relating to the computed urgency score may be used as information to generate baseline urgency scores for the same caller or other callers in the same or a similar cohort.

In some embodiments, a calculated urgency score may be used to optimize a contact center or other type of system. Specific contact center optimizations which may be performed in response to a calculated urgency score may include, for example, adjusting the workload of an agent based on calculated urgency of an assigned work item.

Agents working in contact centers or call centers may be associated with a work log which may track the communication sessions each agent is assigned and conducts while working at the contact center. Such a work log may include information associated with each communication session, such as an urgency score for each communication session.

One contact center may have any number of agents working at any one time. As been shown that agents working under a great deal of stress are associated with not only poor qualities of life but also damage to the ability of the worker to conduct work at a high level of efficiency. Stress caused by workload may be attributed to fielding calls with high levels of urgency. By tracking the urgency level of each call and agent works on or participates in, the computer system may be enabled to accurately estimate the amount of stress each agent is under any given time. For example, an agent with a relatively high number of urgent calls, that is calls with a high level of urgency or a high urgency score, may be determined to be more likely to suffer from stress then other agents with relatively low numbers of urgent calls. Such metrics may be measured on a daily, weekly, monthly, etc. basis.

The computer system may be enabled to adjust the workload of an agent based on an average urgency score for calls which the agent is associated with over a given period of time. For example, the computer system may be configured to assign a communication session associated with a high urgency score to an agent who is associated with a relatively low number of communication sessions having relatively high urgencies scores. In this way, the average urgency score of communication sessions handled by each agent within a call center may be balanced across the call center.

It should be appreciated the urgency score may continuously be updated during a communication session. The urgency score may begin at the baseline and may be updated periodically or continuously throughout the communication session. In this way, the bot or agent instructions may be modified in real-time in response to changes in the urgency score.

At 427, the method 400 may end when the communication session ends. The method 400 as described herein enables calls or other forms of communication sessions to be automatically handled in such a way that was previously impossible.

Using conventional methods, calls of all urgencies are handled in the same way. This results in highly urgent matters to not be handled in a timely manner, resulting in damage and loss of user satisfaction. This is a technical problem in that call centers require technical systems, such as bots, to field calls. Contemporary bots are not capable of dealing with calls based on urgency. The technical problem of bots lacking the ability to deal with calls based on urgency results in harm to users and to enterprises such as call centers.

Using the methods and systems described herein, the previously impossible system is achieved through the use of automatically generated urgency scores based on real-time information as well as past information. This is a technical solution, in that through the use of artificial intelligence, a technical system capable of assigning urgency scores to users and using those urgency scores to handle calls in real-time is achieved. This solves the problem caused by conventional technology which is not capable of handling calls based on urgency scores.

Any of the steps, functions, and operations discussed herein can be performed continuously and automatically.

The exemplary systems and methods of this disclosure have been described in relation to communication devices, multiple-device access environments, and communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein. For instance, while described in conjunction with client-server networks (e.g., conferencing servers, client devices, etc.), it should be appreciated that the components, systems, and/or methods described herein may be employed as part of a peer-to-peer network or other network. As can be appreciated, in a peer-to-peer network, the various components or systems described in conjunction with the communication system 100 may be part of one or more endpoints, or computers, participating in the peer-to-peer network.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for handling a communication, the method comprising: processing data associated with a communication session, generating an urgency score associated with the data based on the processing of the data, and using the urgency score to one or more of modify a behavior of a bot and optimize a contact center.

Aspects of the above method include wherein the behavior of the bot is modified during the communication session in response to the data, wherein modifying the behavior of the bot comprises one or more of modifying dialog of the bot and modifying a control flow, wherein modifying the behavior of the bot comprises escalating the communication session, and/or wherein optimizing the contact center comprises adjusting workload of an agent associated with the communication session.

Aspects of the above method include the method further comprising transferring the communication session to a first agent based on the urgency score. Aspects of the above method include wherein a script associated with the first agent is generated based in part on the urgency score. Aspects of the above method include the method further comprising, prior to transferring the communication session to the first agent, displaying an indication of the urgency score on a display associated with the first agent.

Aspects of the above method include wherein a caller is associated with the communication session, wherein the urgency score is generated based in part on one or more prior communication sessions associated with the caller. Aspects of the above method include wherein the urgency score is generated based in part on a baseline urgency score associated with the caller. Aspects of the above method include wherein the baseline urgency score associated with the caller is based on the one or more prior communication sessions associated with the caller.

Aspects of the above method include wherein a caller is associated with the communication session, wherein the urgency score is generated based in part on one or more prior communication sessions associated with other callers. Aspects of the above method include further comprising identifying the other callers based on one or more attributes of the caller. Aspects of the above method include wherein the urgency score is generated based in part on a baseline urgency score associated with the other callers.

Aspects of the above method include wherein the baseline urgency score associated with the other callers is based on the one or more prior communication sessions associated with the other callers. Aspects of the above method include wherein the urgency score is generated based on one or more of words used by a caller during the communication session, a tone of a voice of the caller during the communication session, and a problem described by the caller during the communication session. Aspects of the above method include the method further comprising generating an urgency bias associated with a caller associated with the communication session. Aspects of the above method include wherein the urgency bias is based on prior communication sessions associated with the caller.

Embodiments include a user device comprising: a processor and a computer-readable storage medium storing computer-readable instructions which, when executed by the processor, cause the processor to execute a method, the method comprising processing data associated with a communication session, generating an urgency score associated with the data based on the processing of the data, and using the urgency score to one or more of modify a behavior of a bot and optimize a contact center.

Aspects of the above user device include wherein the behavior of the bot is modified during the communication session in response to the data, wherein modifying the behavior of the bot comprises one or more of modifying dialog of the bot and modifying a control flow, wherein modifying the behavior of the bot comprises escalating the communication session, and/or wherein optimizing the contact center comprises adjusting workload of an agent associated with the communication session.

Aspects of the above user device include the method further comprising transferring the communication session to a first agent based on the urgency score. Aspects of the above user device include wherein a script associated with the first agent is generated based in part on the urgency score. Aspects of the above user device include the method further comprising, prior to transferring the communication session to the first agent, displaying an indication of the urgency score on a display associated with the first agent.

Aspects of the above user device include wherein a caller is associated with the communication session, wherein the urgency score is generated based in part on one or more prior communication sessions associated with the caller. Aspects of the above user device include wherein the urgency score is generated based in part on a baseline urgency score associated with the caller. Aspects of the above user device include wherein the baseline urgency score associated with the caller is based on the one or more prior communication sessions associated with the caller.

Aspects of the above user device include wherein a caller is associated with the communication session, wherein the urgency score is generated based in part on one or more prior communication sessions associated with other callers. Aspects of the above user device include further comprising identifying the other callers based on one or more attributes of the caller. Aspects of the above user device include wherein the urgency score is generated based in part on a baseline urgency score associated with the other callers.

Aspects of the above user device include wherein the baseline urgency score associated with the other callers is based on the one or more prior communication sessions associated with the other callers. Aspects of the above user device include wherein the urgency score is generated based on one or more of words used by a caller during the communication session, a tone of a voice of the caller during the communication session, and a problem described by the caller during the communication session. Aspects of the above user device include the method further comprising generating an urgency bias associated with a caller associated with the communication session. Aspects of the above user device include wherein the urgency bias is based on prior communication sessions associated with the caller.

Embodiments include a computer program product comprising a non-transitory computer-readable storage medium having computer-readable program code embodied therewith, the computer-readable program code configured, when executed by a processor, to execute a method, the method comprising processing data associated with a communication session, generating an urgency score associated with the data based on the processing of the data, and using the urgency score to one or more of modify a behavior of a bot and optimize a contact center.

Aspects of the above computer program product include wherein the behavior of the bot is modified during the communication session in response to the data, wherein modifying the behavior of the bot comprises one or more of modifying dialog of the bot and modifying a control flow, wherein modifying the behavior of the bot comprises escalating the communication session, and/or wherein optimizing the contact center comprises adjusting workload of an agent associated with the communication session.

Aspects of the above computer program product include the method further comprising transferring the communication session to a first agent based on the urgency score. Aspects of the above computer program product include wherein a script associated with the first agent is generated based in part on the urgency score. Aspects of the above computer program product include the method further comprising, prior to transferring the communication session to the first agent, displaying an indication of the urgency score on a display associated with the first agent.

Aspects of the above computer program product include wherein a caller is associated with the communication session, wherein the urgency score is generated based in part on one or more prior communication sessions associated with the caller. Aspects of the above computer program product include wherein the urgency score is generated based in part on a baseline urgency score associated with the caller. Aspects of the above computer program product include wherein the baseline urgency score associated with the caller is based on the one or more prior communication sessions associated with the caller.

Aspects of the above computer program product include wherein a caller is associated with the communication session, wherein the urgency score is generated based in part on one or more prior communication sessions associated with other callers. Aspects of the above computer program product include further comprising identifying the other callers based on one or more attributes of the caller. Aspects of the above computer program product include wherein the urgency score is generated based in part on a baseline urgency score associated with the other callers.

Aspects of the above computer program product include wherein the baseline urgency score associated with the other callers is based on the one or more prior communication sessions associated with the other callers. Aspects of the above computer program product include wherein the urgency score is generated based on one or more of words used by a caller during the communication session, a tone of a voice of the caller during the communication session, and a problem described by the caller during the communication session. Aspects of the above computer program product include the method further comprising generating an urgency bias associated with a caller associated with the communication session. Aspects of the above computer program product include wherein the urgency bias is based on prior communication sessions associated with the caller.

Any one or more of the aspects/embodiments as substantially disclosed herein. Any one or more of the aspects/embodiments as substantially disclosed herein optionally in combination with any one or more other aspects/embodiments as substantially disclosed herein. One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," "compute," and variations thereof, as used herein, are used interchangeably, and include any type of methodology, process, mathematical operation, or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or server is contemplated to include finite instruction sets and/or artificial intelligence-based models/neural networks to perform some or all of the steps described herein.

What is claimed is:

1. A method for handling a communication, the method comprising:
   processing, during a communication session, data associated with the communication session;
   generating, during the communication session, an urgency score for the communication session based on the processing of the data; and
   based on the urgency score, one or more of escalating the communication session, adjusting workload of a first agent participating in the communication session, and transferring the communication session to a second agent.

2. The method of claim 1, further comprising generating a script associated with one or more of the first agent and the second agent based at least in part on the urgency score.

3. The method of claim 1, further comprising, prior to transferring the communication session to the second agent, displaying an indication of the urgency score on a display associated with the second agent.

4. The method of claim 1, wherein the urgency score is generated based in part on one or more prior communication sessions associated with a caller associated with the communication session.

5. The method of claim 4, wherein the urgency score is generated based at least in part on a baseline urgency score associated with the caller.

6. The method of claim 5, wherein the baseline urgency score associated with the caller is based on the one or more prior communication sessions associated with the caller.

7. The method of claim 1, wherein a caller is associated with the communication session, wherein the urgency score is generated based at least in part on one or more prior communication sessions associated with callers other than the caller associated with the communication session.

8. The method of claim 7, further comprising identifying the callers other than the caller associated with the communication session based on one or more attributes of the caller.

9. The method of claim 7, wherein the urgency score is generated based at least in part on a baseline urgency score associated with the callers other than the caller associated with the communication session.

10. The method of claim 9, wherein the baseline urgency score associated with the callers other than the caller is based on the one or more prior communication sessions associated with the callers other than the caller associated with the communication session.

11. The method of claim 1, wherein the urgency score is generated based on one or more of words used by a caller during the communication session, a tone of a voice of the caller during the communication session, and a problem described by the caller during the communication session.

12. The method of claim 1 further comprising generating an urgency bias associated with a caller associated with the communication session.

13. The method of claim 12, wherein the urgency bias is based on prior communication sessions associated with the caller.

14. A user device comprising:
   a processor; and
   a computer-readable storage medium storing computer-readable instructions which, when executed by the processor, cause the processor to execute a method, the method comprising:
      processing, during a communication session, data associated with the communication session;
      generating, during the communication session, an urgency score for the communication session based on the processing of the data; and
      based on the urgency score, one or more of escalating the communication session, adjusting workload of a first agent participating in the communication session, and transferring the communication session to a second agent.

15. A computer program product comprising:
   a non-transitory computer-readable storage medium having computer-readable program code embodied therewith, the computer-readable program code configured, when executed by a processor, to execute a method, the method comprising:
      processing, during a communication session, data associated with the communication session;
      generating, during the communication session, an urgency score for the communication session based on the processing of the data; and based on the urgency score, one or more of escalating the communication session, adjusting workload of a first agent participating in the communication session, and transferring the communication session to a second agent.

16. The user device of claim 14, wherein the method further comprises generating a script associated with one or more of the first agent and the second agent based at least in part on the urgency score.

17. The user device of claim 14, wherein the method further comprises, prior to transferring the communication session to the second agent, displaying an indication of the urgency score on a display associated with the second agent.

18. The user device of claim 14, wherein the urgency score is generated based in part on one or more prior communication sessions associated with a caller associated with the communication session.

19. The user device of claim 18, wherein the urgency score is generated based at least in part on a baseline urgency score associated with the caller.

20. The user device of claim 19, wherein the baseline urgency score associated with the caller is based on the one or more prior communication sessions associated with the caller.

\* \* \* \* \*